United States Patent

[11] 3,619,163

| [72] | Inventor | Aage J. Alertsen<br>Haslum, Norway |
|---|---|---|
| [21] | Appl. No. | 791,138 |
| [22] | Filed | Jan. 14, 1969 |
| [45] | Patented | Nov. 9, 1971 |
| [73] | Assignee | Elektrokemisk A/S<br>Oslo, Norway |
| [32] | Priority | Jan. 19, 1968 |
| [33] | | Norway |
| [31] | | 227/1968 |

[54] METHOD OF REDUCING THE CAKING TENDENCY OF FERTILIZERS
2 Claims, No Drawings

[52] U.S. Cl. .................................................... 71/64 E,
71/34, 71/62
[51] Int. Cl. ...................................................... C05g 3/00

[50] Field of Search ............................................ 71/64 E, 64
B, 62

[56] References Cited
UNITED STATES PATENTS

| 2,729,598 | 1/1956 | Garbo ........................... | 71/64 E X |
| 3,027,267 | 3/1962 | Alleman et al. .................. | 71/64 E X |
| 3,113,015 | 12/1963 | Brandt et al. ................... | 71/64 E |
| 3,290,158 | 12/1966 | Treat ............................ | 71/62 X |

*Primary Examiner*—Reuben Friedman
*Assistant Examiner*—Bennett H. Levenson
*Attorney*—Eyre, Mann & Lucas

ABSTRACT: Colloidal silicon dioxide-containing flue dust recovered from the smoke from metallurgical processes is used for coating of the grains of particulate fertilizers to reduce the tendency for the particles of the fertilizer to cake.

METHOD OF REDUCING THE CAKING TENDENCY OF FERTILIZERS

This invention relates to a method of reducing the tendency toward caking, which is a well-known problem in connection with storage of fertilizers. This caking is due to the fact that the separate particles of the fertilizers agglomerate so that the material can no longer flow freely. The caking can vary from loose coherence to almost petrification.

Numerous methods and means have been suggested and employed in order to avoid or reduce this caking tendency. A usual method is to mix the ready produced fertilizer with a finely divided material which tends to cover the surface of separate particles of the fertilizer and prevent them from agglomerating.

Many types of such coating material have been suggested and employed and these materials have been of widely different nature and origin. Diatomite, kaolin, rice flour and dried sewage sludge have been employed as well as expensive synthetic materials. All these materials have in common that they are present in a very finely divided state.

It has now been discovered that the powder (dust) which is recovered in dry state from the smoke from metallurgical processes has excellent properties as anticaking material for fertilizers. This powder which contains a major proportion of silicon dioxide, otherwise referred to herein as silica, is recovered from the smoke from smelting furnaces that produce pig iron, ferroalloys and metallic silicon, and from the smoke from furnaces, etc. for metallurgical refining processes. This material is very finely divided. For example, the powder which is recovered from the smoke from furnaces producing metallic silicon has a surface area of 15–20 square meters for each gram. Because of the large specific surface area, there will also be needed considerably less of such colloidal silica than of for instance diatomite in order to obtain the required effect. The fertilizer grains may be coated with the colloidal $SiO_2$ in any known way, for instance by mixing the fertilizer and the colloidal material in a drum mixer.

Any of the known fertilizers may be used in carrying out the present invention. The amount of silica-containing flue dust powder to be mixed with the selected fertilizer may vary from as little as about 5 grams up to about 50 grams for each kilogram of fertilizer. Greater or lesser amounts may be used but in general an amount of powder within the specified range will be adequate for most of the known fertilizers.

In one specific example, colloidal silica-containing flue dust recovered from the smoke of a furnace producing metallic silicon was mixed with a phosphate fertilizer manifesting a caking tendency in a conventional drum mixer in the amount of 30 grams of powder for each kilogram of fertilizer. After 6 months of storage in the usual container there was no noticeable caking and the fertilizer readily poured from the container in finely divided form. In this case the phosphate fertilizer was an ordinary commercial grade of fertilizer with an average particle size of about 3 millimeters and the fertilizer contained 17 percent weight of $P_2O_5$. The colloidal silica-containing flue dust from the smoke of the silicon furnace had a surface area of 18 square meters per gram and the powder contained about 96 percent by weight of silicon dioxide.

It will be understood that it is intended to cover all changes and modifications of the preferred embodiment of the invention, herein chosen for the purpose of illustration, which do not constitute a departure from the spirit and scope of the invention.

What is claimed is:

1. The method of reducing the caking tendency of a particulate fertilizer which comprises mixing the particles of said fertilizer with that colloidal silicon dioxide-containing flue dust which is recovered from the smoke of metallurgical smelting furnaces producing pig iron, ferroalloys, or silicon, to thereby coat the particles, the amount of flue dust being within the range of about 5 grams to about 50 grams for each kilogram of fertilizer.

2. The method of claim 1 wherein the colloidal silicon dioxide-containing flue dust is recovered from smelting furnaces producing metallic silicon.

* * * * *